US009971955B2

(12) United States Patent
He et al.

(10) Patent No.: US 9,971,955 B2
(45) Date of Patent: *May 15, 2018

(54) PHOTOGRAPHING METHOD, PHOTO MANAGEMENT METHOD AND DEVICE

(71) Applicant: Huawei Technologies Co., Ltd., Shenzhen, Guangdong (CN)

(72) Inventors: Zhen He, Shenzhen (CN); Jilin Liu, Shenzhen (CN); Tengyue Li, Shenzhen (CN); Maosheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/447,876

(22) Filed: Mar. 2, 2017

(65) Prior Publication Data

US 2017/0177974 A1 Jun. 22, 2017

Related U.S. Application Data

(63) Continuation of application No. 14/729,866, filed on Jun. 3, 2015, now Pat. No. 9,626,592, which is a (Continued)

(30) Foreign Application Priority Data

Jun. 6, 2013 (CN) .......................... 2013 1 0222511

(51) Int. Cl.
*G06K 9/62* (2006.01)
*G06K 9/00* (2006.01)
(Continued)

(52) U.S. Cl.
CPC ....... *G06K 9/6202* (2013.01); *G06K 9/00664* (2013.01); *G06K 9/6267* (2013.01);
(Continued)

(58) Field of Classification Search
CPC combination set(s) only.
See application file for complete search history.

(56) References Cited

U.S. PATENT DOCUMENTS 5,357,308 A 10/1994 Goo
6,307,544 B1 * 10/2001 Harding ................ G06F 9/4446
715/709

(Continued)

FOREIGN PATENT DOCUMENTS

CN 1061446 C 1/2001
CN 1964434 A 5/2007

(Continued)

OTHER PUBLICATIONS

Machine Translation and Abstract of Chinese Publication No. CN1964434, May 16, 2007, 9 pages.

(Continued)

*Primary Examiner* — Tsung-Yin Tsai
(74) *Attorney, Agent, or Firm* — Conley Rose, P.C.

(57) ABSTRACT

A photographing method includes acquiring to-be-photographed first content, acquiring an image composition relationship between a second subject in the first content and the first subject after determining a first subject with which a user is concerned in the first content, where the second subject is another background subject in the first content except the first subject, matching the image composition relationship between the second subject and the first subject with a preset image composition template to obtain a matching evaluation degree, and providing an image composition adjustment suggestion on the first content for the user according to the matching evaluation degree and the image composition template, where the adjustment suggestion is a tip on how to adjust the image composition relationship in (Continued)

the first content such that the image composition relationship completely matches the preset image composition template.

16 Claims, 12 Drawing Sheets

Related U.S. Application Data continuation of application No. 14/496,221, filed on Sep. 25, 2014, now Pat. No. 9,076,073, which is a continuation of application No. PCT/CN2014/070882, filed on Jan. 20, 2014.

(51) Int. Cl.

*H04N 5/232* (2006.01)
*G06T 7/194* (2017.01)
*G06T 7/11* (2017.01)

(52) U.S. Cl.

CPC ................ *G06T 7/11* (2017.01); *G06T 7/194* (2017.01); *H04N 5/23222* (2013.01); *G06T 2207/20104* (2013.01)

(56) References Cited

U.S. PATENT DOCUMENTS

| | | | | |
|---|---|---|---|---|
| 6,608,650 | B1 * | 8/2003 | Torres | H04N 5/232 348/231.3 |
| 6,941,323 | B1 * | 9/2005 | Galperin | G06F 17/30247 |
| 7,035,467 | B2 * | 4/2006 | Nicponski | G06K 9/00221 382/190 |
| 7,228,151 | B2 | 6/2007 | Kota et al. | |
| 7,239,350 | B2 * | 7/2007 | Ban | H04N 5/23222 348/231.3 |
| 7,317,485 | B1 * | 1/2008 | Miyake | G03B 17/20 348/333.02 |
| 8,068,678 | B2 * | 11/2011 | Tobita | G06F 17/30784 382/224 |
| 2003/0115175 | A1 * | 6/2003 | Baatz | G06K 9/0063 |
| 2005/0088542 | A1 * | 4/2005 | Stavely | H04N 5/232 348/239 |
| 2007/0024909 | A1 * | 2/2007 | Hanechak | G06F 17/211 358/1.18 |
| 2008/0205769 | A1 * | 8/2008 | Taguchi | G06K 9/6202 382/209 |
| 2009/0089258 | A1 | 4/2009 | Ke | |
| 2009/0116752 | A1 * | 5/2009 | Isomura | G06F 17/30265 382/217 |
| 2011/0026835 | A1 * | 2/2011 | Ptucha | G06F 17/30247 382/209 |
| 2011/0087674 | A1 | 4/2011 | Schokking et al. | |
| 2012/0013759 | A1 | 1/2012 | Chen | |
| 2012/0098992 | A1 * | 4/2012 | Hosoe | G06K 9/00255 348/222.1 |
| 2014/0253592 | A1 * | 9/2014 | Cho | G06T 19/006 345/633 |
| 2015/0010239 | A1 * | 1/2015 | He | G06K 9/6202 382/203 |
| 2015/0098000 | A1 * | 4/2015 | Gosangi | H04N 5/23293 348/333.02 |

FOREIGN PATENT DOCUMENTS

| | | | |
|---|---|---|---|
| CN | 101193206 | A | 6/2008 |
| CN | 101216883 | A | 7/2008 |
| CN | 100505833 | C | 6/2009 |
| CN | 101562699 | A | 10/2009 |
| CN | 101840146 | A | 9/2010 |
| CN | 101945202 | A | 1/2011 |
| CN | 102014248 | A | 4/2011 |
| CN | 102033958 | A | 4/2011 |
| CN | 102063709 | A | 5/2011 |
| CN | 102082864 | A | 6/2011 |
| CN | 102333176 | A | 1/2012 |
| CN | 102457664 | A | 5/2012 |
| EP | 0411906 | A3 | 7/1990 |
| EP | 1427190 | A1 | 6/2004 |
| EP | 1603328 | A3 | 12/2005 |

OTHER PUBLICATIONS

Machine Translation and Abstract of Chinese Publication No. CN101193206, Jun. 4, 2008, 9 pages.

Machine Translation and Abstract of Chinese Publication No. CN101216883, Jul. 9, 2008, 30 pages.

Machine Translation and Abstract of Chinese Publication No. CN101562699, Oct. 21, 2009, 6 pages.

Machine Translation and Abstract of Chinese Publication No. CN101840146, Sep. 22, 2010, 11 pages.

Machine Translation and Abstract of Chinese Publication No. CN101945202, Jan. 12, 2011, 7 pages.

Machine Translation and Abstract of Chinese Publication No. CN102014248, Apr. 13, 2011, 17 pages.

Machine Translation and Abstract of Chinese Publication No. CN102063709, May 18, 2011, 4 pages.

Machine Translation and Abstract of Chinese Publication No. CN102082864, Jun. 1, 2011, 5 pages.

Machine Translation and Abstract of Chinese Publication No. CN102033958, Apr. 27, 2011, 15 pages.

Chen, G., et al., "LifeLog—Action Life and portable travel recorder cum photo information analysis system,"WCSOA-1-24, Apr. 1, 2012, 11 pages.

Chen, G., et al., "LifeLog—Action Life and portable travel recorder cum photo information analysis system," Works Report, English Translation dated Jul. 26, 2017, 10 pages.

Foreign Communication From a Counterpart Application, Chinese Application No. 201310222511.3, Chinese Office Action dated Jan. 5, 2017, 7 pages.

Foreign Communication From a Counterpart Application, PCT Application No. PCT/CN2014/070882, English Translation of International Search Report dated Apr. 23, 2014, 2 pages.

Foreign Communication From a Counterpart Application, PCT Application No. PCT/CN2014/070882, English Translation of Written Opinion dated Apr. 23, 2014, 14 pages.

* cited by examiner

PHOTOGRAPHING METHOD, PHOTO MANAGEMENT METHOD AND DEVICE

CROSS-REFERENCE TO RELATED APPLICATIONS

This application is a continuation of U.S. patent application Ser. No. 14/729,866 filed on Jun. 3, 2015, which is a continuation of U.S. patent application Ser. No. 14/496,221 filed on Sep. 25, 2014, now U.S. Pat. No. 9,076,073, which is a continuation of International Patent Application No. PCT/CN2014/070882 filed on Jan. 20, 2014, which claims priority to Chinese Patent Application No. 201310222511.3 filed on Jun. 6, 2013. All of the afore-mentioned patent applications are hereby incorporated by reference in their entireties.

TECHNICAL FIELD

Embodiments of the present disclosure relate to communications technologies, and in particular, to a photographing method, and a photo management method and device.

BACKGROUND

Currently, with increasingly high requirements for photography, a user more hopes to capture each classic moment, and hopes that a photo taken by the user is more professional. However, a nonprofessional person often cannot take a professional photo, and therefore, cannot well capture a wonderful moment.

With the development of smart cameras, the smart cameras have scene modes that switch automatically, for example, a smart camera detects a corresponding scene, and sets parameters correspondingly. For example, the scene modes include a portrait mode, a landscape mode, a macro mode, a sports mode, and the like. When a smart camera is used for photographing a landscape, after detection by a sensor in the smart camera, a mode with parameter settings most suitable for photographing the landscape can be automatically switched to the landscape mode, and when a lens of the smart camera is close to a subject to be photographed, the mode can be automatically switched to the macro mode, thereby implementing focusing a close subject for photographing. The mode is switched to the sports mode when the smart camera photographs a moving subject, and a shutter speed increases. This technology meets requirements of users for several most commonly used scenes, and parameters in some modes with automatic settings also make a photo better.

However, the foregoing smart camera cannot help the user with framing or image composition, that is, in a current photographing process, image composition quality of a to-be-taken photo cannot be determined or adjusted, which results in a poor photographing result.

In addition, there are many photos in the current smart camera, of which some are taken with a good effect, and some are taken with a poor effect. The current smart camera cannot automatically manage the photos, and instead the user has to view each photo in person, select and delete a photo taken with a poor effect, and sort through photos taken with a similar effect.

SUMMARY

In view of this, embodiments of the present disclosure provide a photographing method, and a photo management method and device, which are used to solve the problem that in a photographing process, image composition quality of photographing cannot be determined or adjusted, which results in a poor photographing result, and in addition, further solve the problem that a smart camera cannot automatically manage a photo.

According to a first aspect, an embodiment of the present disclosure provides a photographing method, which includes acquiring to-be-photographed first content, acquiring an image composition relationship between a second subject in the first content and the first subject after determining a first subject with which a user is concerned in the first content, where the second subject is a background subject in the first content except the first subject, matching the image composition relationship between the second subject and the first subject with a preset image composition template to obtain a matching evaluation degree, and providing an image composition adjustment suggestion on the first content for the user according to the matching evaluation degree and the preset image composition template, where the adjustment suggestion is a tip on how to adjust the image composition relationship in the first content such that the image composition relationship completely matches the preset image composition template, where the matching evaluation degree indicates properness of the image composition relationship.

With reference to the first aspect, in a first optional implementation manner, before acquiring an image composition relationship between a second subject in the first content and the first subject after determining a first subject with which a user is concerned in the first content, the method further includes selecting, by the user, the first subject of concern in the first content.

With reference to the first aspect, in a second optional implementation manner, before acquiring an image composition relationship between a second subject in the first content and the first subject, the method further includes recognizing the first subject according to subject images in a preset subject image library, and correspondingly, before matching the image composition relationship between the second subject and the first subject with a preset image composition template, the method further includes searching, according to the recognized first subject, an image composition template library for an image composition template corresponding to the first subject, and setting the found image composition template corresponding to the first subject as the preset image composition template.

With reference to the first aspect, in a third optional implementation manner, the preset image composition template is a golden section template, a compact template, a triangular image composition template, a diagonal image composition template, a vertical line image composition template, or a horizontal line image composition template.

According to a second aspect, an embodiment of the present disclosure provides a photographing device, which includes a first acquiring unit configured to acquire to-be-photographed first content, a second acquiring unit configured to acquire an image composition relationship between a second subject in the first content and the first subject after the first acquiring unit acquires the first content, and after a first subject with which a user is concerned in the first content is determined, where the second subject is a background subject in the first content except the first subject. A matching unit configured to match the image composition relationship between the second subject and the first subject with a preset image composition template to obtain a matching evaluation degree after the second acquiring unit acquires the image composition relationship, and an image composition adjustment suggestion obtaining unit configured to provide an image composition adjustment suggestion on the first content for the user according to the matching evaluation degree and the preset image composition template after the matching unit obtains the matching evaluation degree, where the adjustment suggestion is a tip on how to adjust the image composition relationship in the first content such that the image composition relationship completely matches the preset image composition template, and the matching evaluation degree indicates properness of the image composition relationship.

With reference to the second aspect, in a first optional implementation manner, the photographing device further includes a first subject selection unit configured to select, by the user, the first subject of concern in the first content after the first acquiring unit acquires the first content.

With reference to the second aspect, in a second optional implementation manner, the photographing device further includes a recognition unit configured to recognize the first subject according to subject images in a preset subject image library after the first acquiring unit acquires the first content, and after a first subject with which the user is concerned in the first content is determined, and an image composition template selection unit configured to search, according to the recognized first subject, an image composition template library for an image composition template corresponding to the first subject, and set the found image composition template corresponding to the first subject as the preset image composition template after the recognition unit recognizes the first subject.

According to a third aspect, an embodiment of the present disclosure further provides a photo management method, which includes selecting a to-be-evaluated photo, and obtaining a main subject and a background subject of the photo according to a focal point of the photo, determining an image composition relationship between the main subject and the background subject, matching the image composition relationship between the main subject and the background subject with a preset image composition template to obtain a matching evaluation degree, and classifying the photo according to the matching evaluation degree, where the matching evaluation degree indicates properness of the image composition relationship.

With reference to the third aspect, in a first optional implementation manner, the preset image composition template is a golden section template, a compact template, a triangular image composition template, a diagonal image composition template, a vertical line image composition template, or a horizontal line image composition template.

According to a fourth aspect, an embodiment of the present disclosure provides a photo management apparatus, which includes a selection unit configured to select a to-be-evaluated photo, and obtain a main subject and a background subject of the photo according to a focal point of the photo, a determining unit configured to determine an image composition relationship between the main subject and the background subject after the selection unit obtains the main subject, a matching unit configured to match the image composition relationship between the main subject and the background subject with a preset image composition template to obtain a matching evaluation degree after the determining unit determines the image composition relationship, and a classification unit configured to classify the photo according to the matching evaluation degree after the matching unit obtains the matching evaluation degree, where the matching evaluation degree indicates properness of the image composition relationship.

As can be learned from the foregoing technical solutions, in a photographing method, and a photo management method and device in the embodiments of the present disclosure, a first subject with which a user is concerned is determined in to-be-photographed first content to obtain an image composition relationship between the first subject and a second subject in the first content, further, the image composition relationship is matched with a preset image composition template to obtain a matching evaluation degree, and further, an image composition adjustment suggestion on the first content is provided for the user according to the matching evaluation degree in order to solve the problem that in a photographing process, image composition quality of photographing cannot be determined or adjusted, which results in a poor photographing result. In addition, further solve the problem that a smart camera cannot automatically manage a photo.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following clearly describes the technical solutions of the present disclosure with reference to the accompanying drawings in the embodiments of the present disclosure. The described embodiments are a part of the embodiments of the present disclosure. Based on the embodiments of the present disclosure, a person of ordinary skill in the art can obtain other embodiments which can solve the technical problem of the present disclosure and implement the technical effect of the present disclosure by equivalently altering a part of or all the technical features even without creative efforts. The embodiments obtained through alteration do not depart from the scope disclosed in the present disclosure.

An embodiment of the present disclosure provides a photographing method, where the photographing method is capable of image composition quality analysis and evaluation, and enables a user to automatically adjust image composition and a layout according to an image composition analysis suggestion.

First Embodiment

Figure 1:
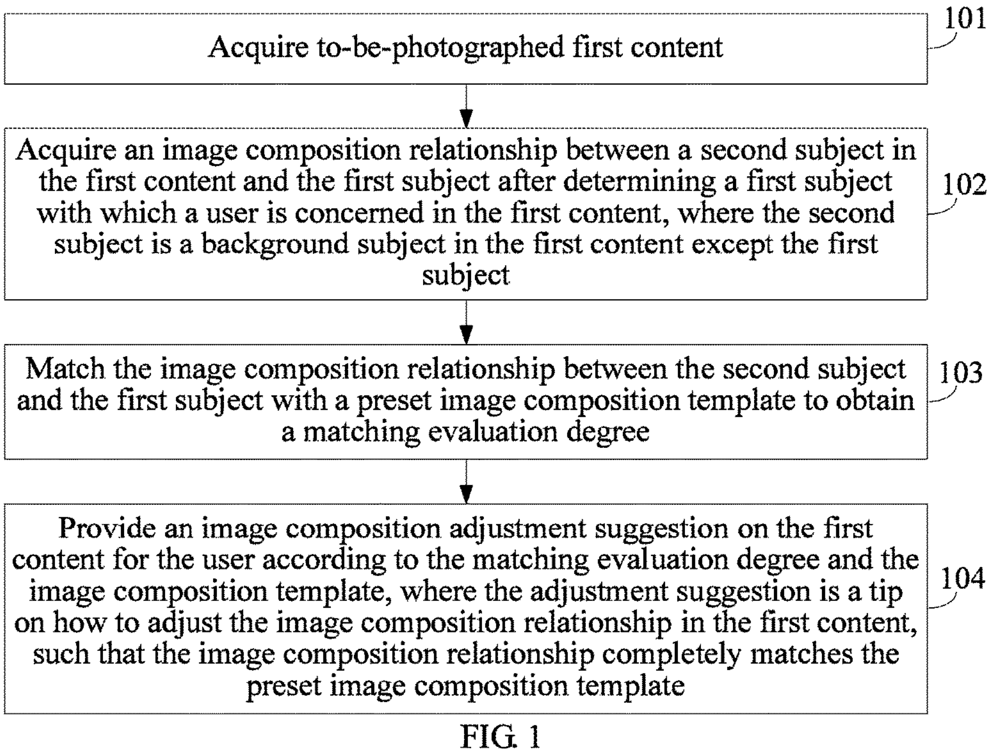
FIG. 1 is a schematic flowchart of a photographing method according to an embodiment of the present disclosure.

FIG. 1 shows a photographing method according to an embodiment of the present disclosure. As shown in FIG. 1, the photographing method in this embodiment is described as follows.

Step 101: Acquire to-be-photographed first content.

Step 102: Acquire an image composition relationship between a second subject in the first content and the first subject after determining a first subject with which a user is concerned in the first content, where the second subject is a background subject in the first content except the first subject.

For example, the first subject may be a partial close-up of a building, a partial close-up of a landscape, a person, multiple persons, an area in a range, or a river, a section of path, or the like.

If the first subject is a river, trees around the river, and the like are all the background subject.

It should be noted that the first subject in this embodiment may be multiple areas in the first content.

Step 103: Match the image composition relationship between the second subject and the first subject with a preset image composition template to obtain a matching evaluation degree.

The image composition relationship in this embodiment refers to a relative location relationship of the first subject in the second subject. In addition, the matching evaluation degree in this embodiment indicates properness of the image composition relationship.

Currently, image composition is defined as follows. An image to be shown is properly organized according to requirements of a topic and a theme to form a harmonious and complete picture, which is referred to as image composition.

For example, the matching evaluation degree may be a qualitative evaluation such as "good," "excellent," or "poor," or may be a quantitative evaluation such as a rating of "5 points." "3 points," or "1 point."

It can be understood that matching the image composition relationship between the second subject and the first subject with a preset image composition template can be understood as location matching performed using the image composition relationship and a special line or a special point in the preset image composition template, for example, a location of an outline of the first subject in the image composition relationship is close to a golden section point in a golden section template or is not close to a golden section point in a golden section template, and the matching evaluation degree is high if the location of the outline of the first subject in the image composition relationship is close to the golden section point in the golden section template.

Alternatively, whether a location of an outline of the first subject in the image composition relationship falls within an area formed by golden section points in a golden section template or does not fall within an area formed by golden section points in a golden section template, and the matching evaluation degree is high if the location of the outline of the first subject in the image composition relationship falls within the area formed by golden section points in the golden section template. Details are as those described in the following FIG. 3A to FIG. 3K.

The preset image composition template in this embodiment may be a golden section template, a compact template, a triangular image composition template, a diagonal image composition template, a vertical line image composition template, and/or a horizontal line image composition template, an asymmetric image composition template, an S-shaped image composition template, an X-shaped image composition template, or the like.

Step 104: Provide an image composition adjustment suggestion on the first content for the user according to the matching evaluation degree and the image composition template, where the adjustment suggestion is a tip on how to adjust the image composition relationship in the first content such that the image composition relationship completely matches the preset image composition template.

For example, the image composition adjustment suggestion may be given using an illustration. For example, as shown in FIG. 3B and FIG. 3C the illustration includes an arrow indicating a direction of adjustment, a dotted box of an ideal image composition location, or the like.

In another embodiment, the image composition adjustment suggestion may also be given by means of words, or the image composition adjustment suggestion is prompted by means of a voice, or the like.

As can be learned from the foregoing embodiment, in a photographing method in this embodiment, after a first subject with which a user is concerned is determined in to-be-photographed first content, an image composition relationship between the first subject and a second subject in the first content is obtained, further, the image composition relationship is matched with a preset image composition template to obtain a matching evaluation degree, and further, an image composition adjustment suggestion on the first content is provided for the user according to the matching evaluation degree in order to solve the problem that in a photographing process, image composition quality of photographing cannot be determined or adjusted, which results in a poor photographing result.

For example, the foregoing step 101 to step 104 in FIG. 1 may be executed by any device with a photographing function, such as a camera, a mobile phone with a photographing function, a computer with a photographing function, or a tablet computer with a photographing function.

It can be understood that, in an actual application, a display unit of any photographing device can display to-be-photographed first content, and here the first content is framed content of the photographing device, that is, content to be photographed as a photo by the photographing device. For example, a display screen of the camera displays content seen by a lens of the photographing apparatus.

Figure 2A:
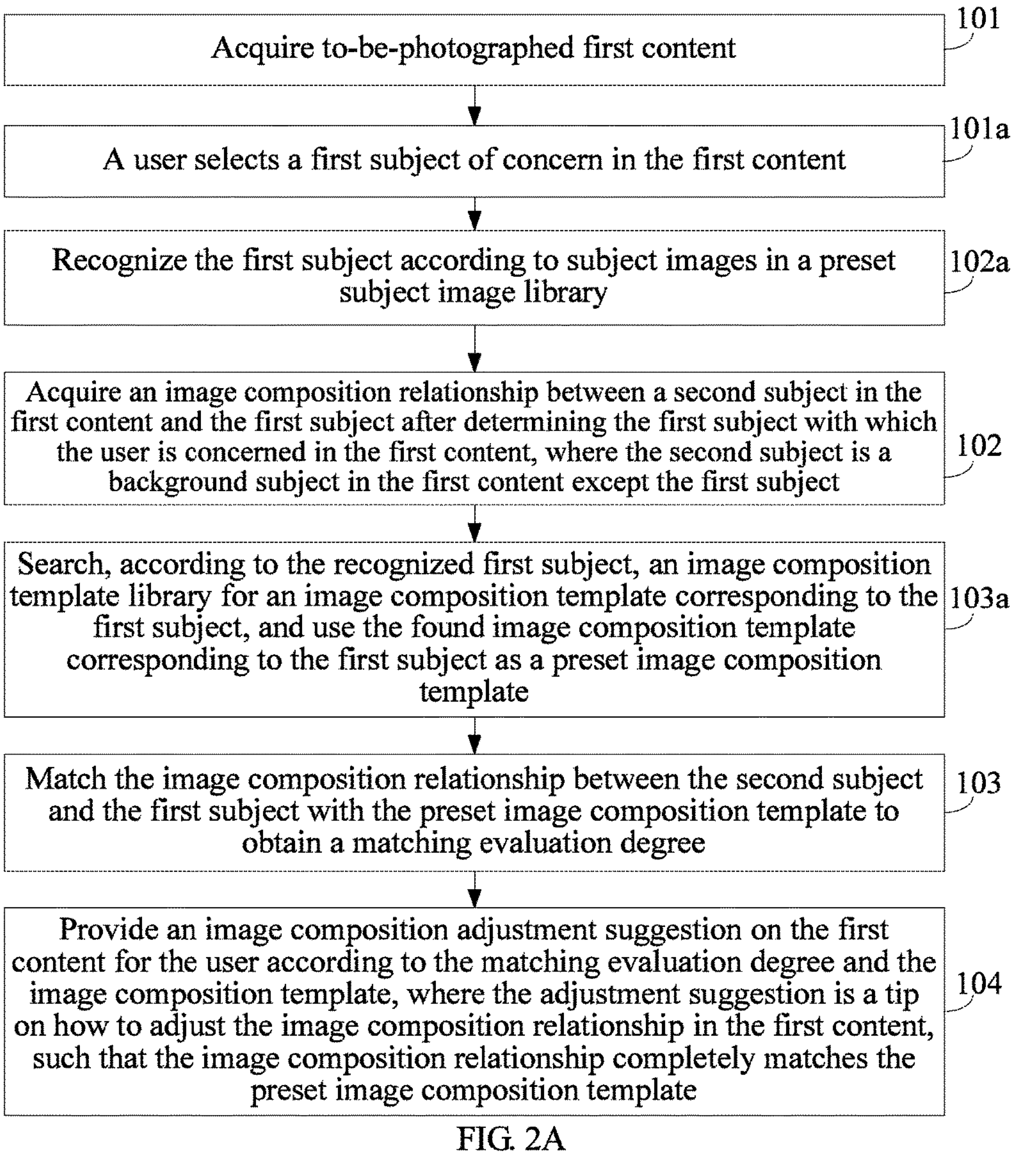
FIG. 2A is a schematic flowchart of a photographing method according to another embodiment of the present disclosure.

As shown in FIG. 2A, in an optional implementation manner, after step 101 of the foregoing photographing method, the photographing method may further include the following step 101*a*.

Step 101*a*: The user selects the first subject of concern in the first content.

In other words, before the foregoing step 102, determining the first subject with which the user is concerned in the first content may be that the user selects a part of content in the first content as the first subject of concern. For example, the display screen described above is a touch screen, and the user can select a subject on the touch screen as the first subject of concern. Generally, the user may select the first subject of concern by tapping, double tapping, sliding, drawing a circle, or the like.

The first subject herein may be a subject, a person, a building, or the like in the first content. In another embodiment, the first subject may further be a subject that is currently focused on by a camera and is used by default as the subject with which a user is concerned.

As shown in FIG. 2A, in a second optional implementation manner, before the step of "acquiring an image composition relationship between a second subject in the first content and the first subject after determining a first subject with which a user is concerned in the first content" in step 102, the photographing method may further include the following step 102*a*.

Step 102*a*: Recognize the first subject according to subject images in a preset subject image library.

For example, model diagrams of multiple subject images are stored in the subject image library in this embodiment, such as models of an apple, a graphic building, a river, a mountain, and a person.

Figure 2B:
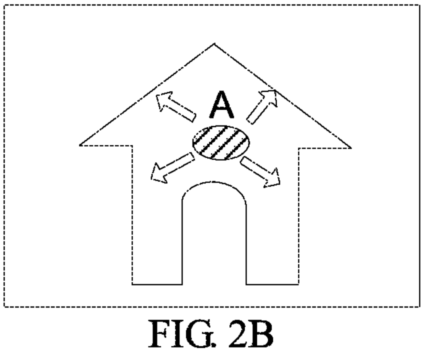
FIG. 2B is a schematic diagram of photographed content according to an embodiment of the present disclosure.

If the user touches the screen using a unit, the photographing device detects that the user touches a plane being an area A with a finger, and as shown in FIG. 2B, in this case, the photographing device extends the area A, which is used as a basic point, to a surrounding until an edge of the subject, that is a location where a jump occurs in a depth. In this way, the outline of the first subject is extracted, and the first subject is recognized as a person, an animal, a plant, or the like, by being compared with the subject image library.

For example, first a color quantity corresponding to each pixel is analyzed. For example, three components red (R), green (G), and blue (B) are used for representing each pixel of a color image, and each component has 8 bits. In this way, one pixel is represented using 24 bits in total, that is, the pixel depth is 24. Each pixel may be one of 16,777,216 (2 to the power of 24) colors.

Second, with gradual outward extension of pixel point analysis, when the color quantity of a related pixel greatly differs from the color quantity of a pixel that is extended outward, it is considered that it may be an outline.

Subsequently, many outlines obtained by analyzing a pixel quantity are analyzed comprehensively, and are compared with the subject image recognition library such that what subject it is may be obtained.

Figure 2C:
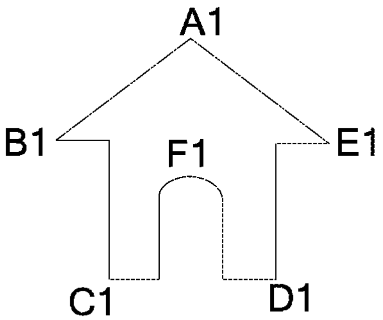
FIG. 2C is a schematic outline diagram of a first subject in FIG. 2B.
Figure 2D:
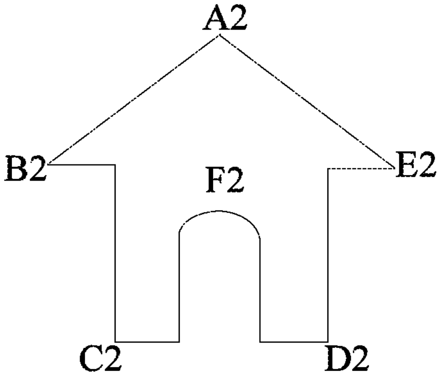
FIG. 2D is a schematic outline diagram of a subject in a subject recognition library according to an embodiment of the present disclosure.

As shown in FIG. 2C and FIG. 2D, FIG. 2C is a first subject with which a user is concerned in first content, and FIG. 2D is a preset subject image in a subject image library.

To compare a first image with subject images in the subject image library, the following step is performed. Searching for some special points in the outline of the first subject (such as an angular location, or a location of a turning point), for example, A1, B1, C1, D1, E1 and F1 in FIG. 2C. A layout feature and proportion of the first subject are analyzed according to the special points, a subject that has a layout feature with a high similarity with that of the first subject is found in the subject image library, and what the first subject is may be recognized according to a subject name in the subject image library.

Optionally, after the first subject is recognized, detailed features of the first subject may further be found by means of histogram analysis, lighting analysis, facial recognition, and the like.

Step 103*a*: Search, according to the recognized first subject, an image composition template library for an image composition template corresponding to the first subject, and use the found image composition template corresponding to the first subject as a preset image composition template.

Generally, after the first subject is recognized, an image composition template corresponding to an image composition relationship between the second subject and the first subject may be selected according to a Table (for example, Table 1 as follows) of preset image composition templates and subjects of concern.

TABLE 1

| First subject of concern | Image composition plate |
|---|---|
| Partial close-up | Compact layout, and big and small layout |
| One person or subject | Golden section, and centripetal image composition |
| Two persons or subjects | Big and small, and symmetrical image composition |
| Three persons or subjects | Triangular image composition, and diagonal image composition |
| Multiple persons or subjects (high mountains, waterfalls, buildings, or the like) | Vertical line image composition, horizontal line image composition, and diagonal image composition |
| An area in a range, and a distant landscape | Golden section, and asymmetric image composition |
| A (section of) path, river, winding path, or the like | S-shaped image composition, X-shaped image composition, and diagonal image composition |

The photographing method in the foregoing embodiment can well solve the problem that in a photographing process, image composition quality of photographing cannot be determined or adjusted, which results in a poor photographing result.

In another embodiment, step 103 and step 104 in FIG. 1 are used as an example for description.

Figure 3A:
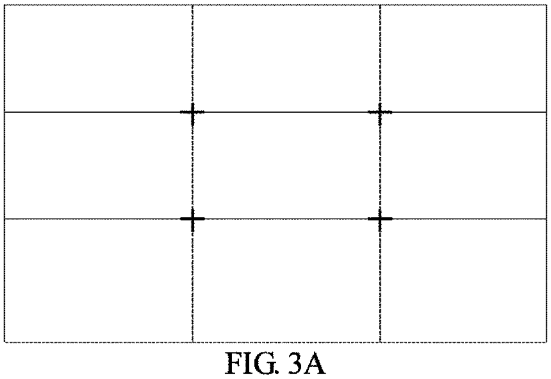
FIG. 3A is a schematic diagram of an image composition template according to an embodiment of the present disclosure.
Figure 3B:
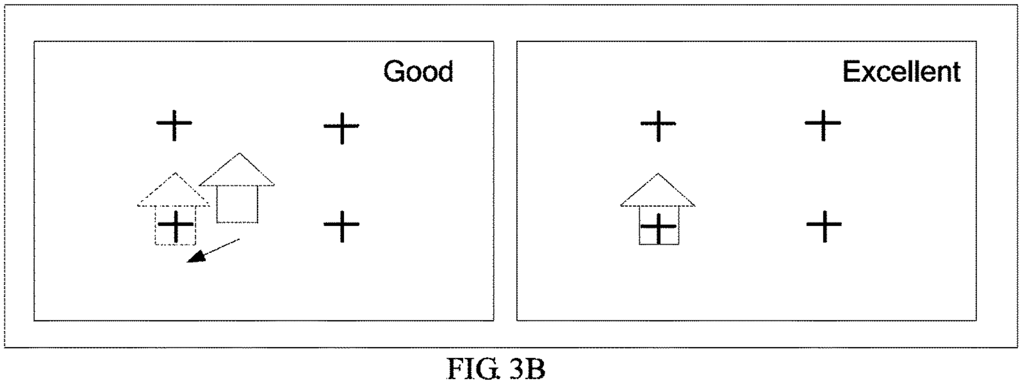
FIG. 3B, FIG. 3C, FIG. 3D, and FIG. 3E are schematic diagrams of adjustment of photographed first content according to an embodiment of the present disclosure.
Figure 3C:
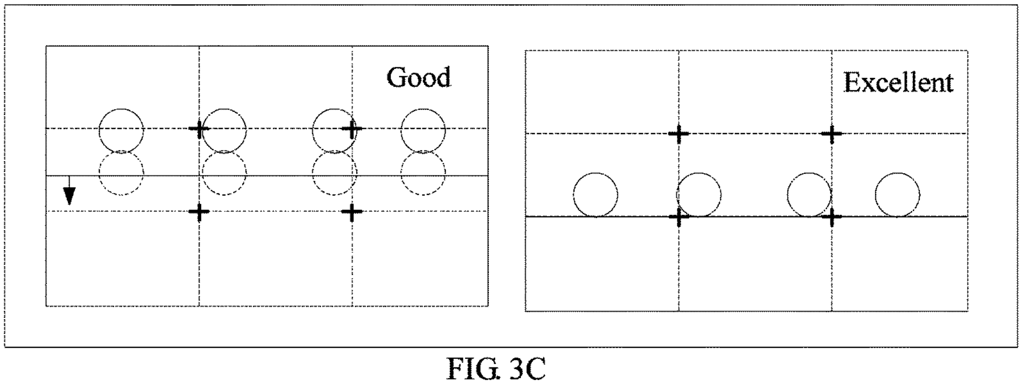

As shown in FIG. 3A, if the preset image composition template is a golden section image composition template, in step 103, when matching the image composition relationship between the second subject and the first subject with the golden section image composition template, the photographing device analyzes relative locations of the current second subject and first subject. For example, first, the outline of the first subject of concern, second, detecting whether the outline of the first subject is close to all golden section points in the golden section image composition template (that is, whether close to four “cross” marks in FIG. 3A). If the outline of the first subject is close to all golden section points, the image composition relationship between the second subject and the first subject can obtain a high matching evaluation degree.

It can be understood that if the first subject is a range, for example, a rectangular box, the photographing device first detects whether an edge of the first subject is close to a golden section line (for example, four dotted lines in FIG. 3A). If the edge of the first subject is close to the golden section line, the image composition relationship between the second subject and the first subject has a high matching evaluation degree.

In step 104, the image composition adjustment suggestion on the first content is provided for the user/photographer according to the matching evaluation degree and the golden section image composition template, where the adjustment suggestion is a tip on how to adjust the image composition relationship in the first content such that the image composition relationship completely matches the preset image composition template.

In other words, as shown in FIG. 3B, the illustrated image composition adjustment suggestion may be a suggestion, given through a pointing arrow, for moving the first subject to locations of the four cross marks in FIG. 3A.

In addition, as shown in FIG. 3C, if the second subject is a range, the illustrated image composition adjustment suggestion is that the edge of the first subject be as close to the golden section line as possible.

In FIG. 3B, when the photographing device detects that a location of a house (that is, the first subject) relative to a location of the background (the second subject) is backward, and after matching the image composition relationship with the golden section image composition template, learns that the first subject in the image composition relationship is close to a lower left golden section point. After matching, comparison, and computation, the photographing device gives a matching evaluation degree, and at the same time, gives an image composition adjustment suggestion. For example, it is suggested that the location of the house in a viewfinder frame may be close to a location of the dotted line, and further, after the user performs adjustment in the viewfinder frame according to the image composition adjustment suggestion, the matching evaluation degree is updated accordingly at the same time (as shown in the right diagram in FIG. 3B).

In FIG. 3C, in the left diagram of FIG. 3C, when the photographing device detects that a horizontal plane (an edge of a range, that is, the first subject) is closer to a location of a golden section line in the golden section image composition template, after matching the image composition relationship with the golden section image composition template, the photographing device obtains that the first subject in the image composition relationship is closer to a location of a lower section line. In this case, after matching, comparison, and computing, a matching evaluation degree is given, and further, an image composition adjustment suggestion is given, where the image composition adjustment suggestion may be an illustrated suggestion, which suggests that the user adjust framing according to a direction of the dotted line. After the user adjusts the framing according to the image composition adjustment suggestion, the matching evaluation degree is refreshed immediately, as shown in the right diagram of FIG. 3C.

Figure 3D:
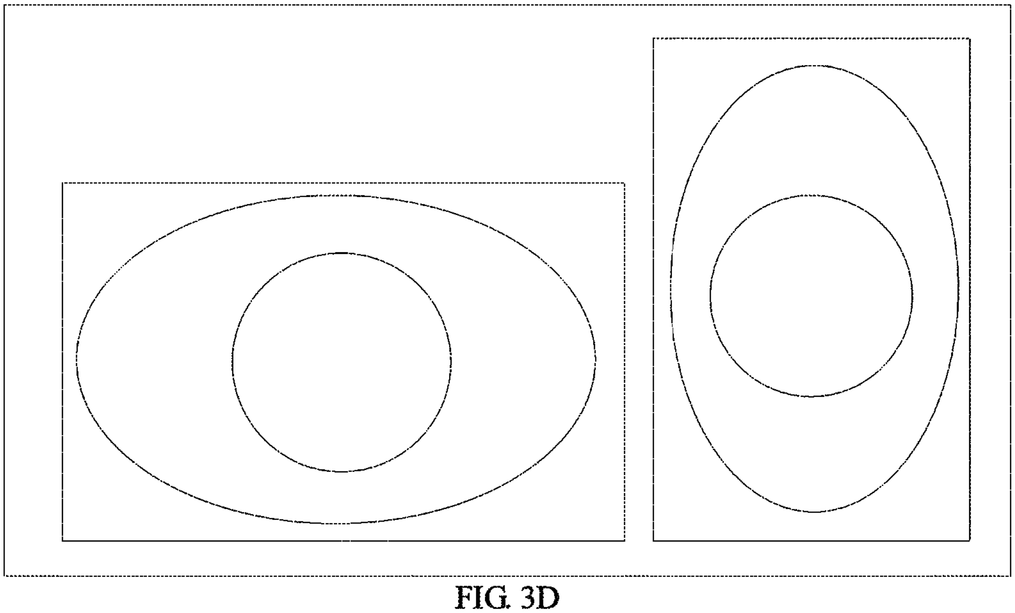

In another embodiment, as shown in the left diagram or the right diagram of FIG. 3D, the preset image composition template may be a compact image composition template.

When the photographing device matches the image composition relationship between the second subject and the first subject with the compact image composition template, if the first subject stands out as a whole relative to the location the second subject, and is close to a central area of the first content, a relative rating, of the matching evaluation degree, provided by the photographing device is high.

In this case, when the image composition adjustment suggestion is given in step 104, it may be suggested, using an illustration, that the first subject is better placed in the central area, and the edge of the first subject better fill the picture, enabling the picture to be rich in compact, delicate, and microcosmic features.

Figure 3E:
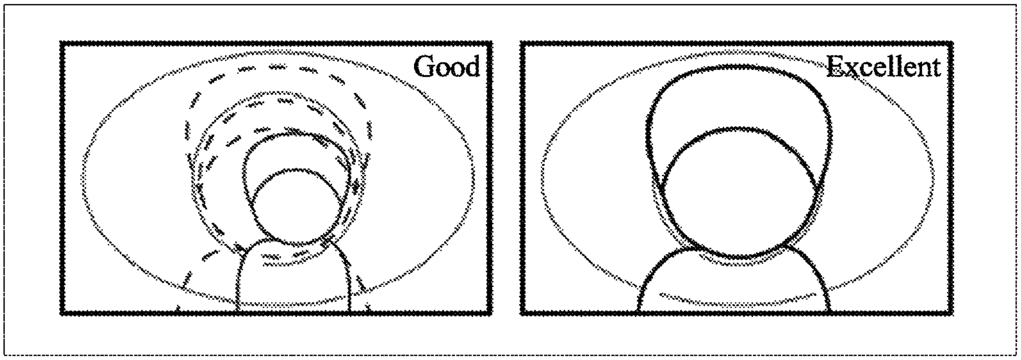

If the photographing device detects that a partial close-up of a human face (that is, the first subject) relative to the entire image composition background is backward, the photographing device matches the image composition relationship with the compact image composition template, and learns that a location of the human face in the screen is not far from a location of a central subject, but is not very full, and therefore a rating of the matching evaluation degree of the first content is medium, as shown in the left diagram of FIG. 3E.

In this case, the image composition adjustment suggestion provided in step 104 may suggest, using an illustration, that a location of the close-up of the portrait cover more in a central area of the subject, and other elements of the portrait cover an outer edge area as much as possible. After the user/photographer adjusts the location of the first subject, the rating of the matching evaluation degree is refreshed immediately, as shown in the right diagram of FIG. 3E.

Figure 3F:
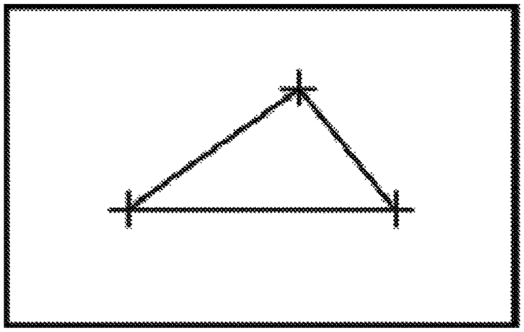
FIG. 3F is a schematic diagram of an image composition template according to another embodiment of the present disclosure.

As shown in FIG. 3F, in a third embodiment, the preset image composition template may be a triangular image composition template. The photographing device analyzes whether three outlines of the image composition relationship between the first subject and the second subject form a triangle in a center of a framed picture when the photographing device matches the image composition relationship between the second subject and the first subject with the triangular image composition template.

A better matching evaluation degree is obtained if the three outlines of the image composition relationship between the first subject and the second subject form a rich triangle in the center of the framed picture.

Figure 3G:
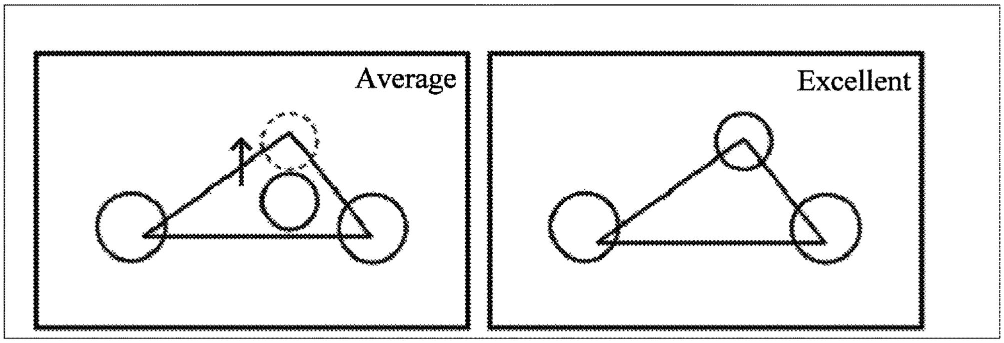
FIG. 3G is a schematic diagram of adjustment of photographed first content according to another embodiment of the present disclosure.

In FIG. 3G when three points of interest of the image composition relationship between the first subject (the subject of concern) and the second subject (the background subject) are three little balls, the image composition relationship is matched with the triangular image composition template.

The triangle in the left diagram of FIG. 3G (the image composition relationship between the first subject and the second subject) is not balanced enough, and therefore, a point value of the matching evaluation degree is a rating of “average.”

Accordingly, in step 104, the image composition adjustment suggestion may suggest, using an illustration, that a location of a little ball behind move slightly upwards to form a fuller and more balanced image composition relationship.

After the user/photographer adjusts framing of the first content, the rating of the matching evaluation degree in step 103 is refreshed immediately.

As shown in the right diagram of FIG. 3G the user raises a location for framing, and achieves an effect that three balls form a triangle such that the whole image composition is more balanced and stable.

Figure 3H:
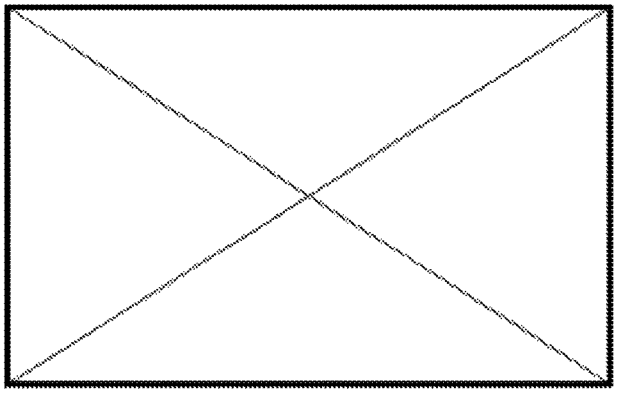
FIG. 3H is a schematic diagram of an image composition template according to another embodiment of the present disclosure.

As shown in FIG. 3H, in a fourth embodiment, the preset image composition template may be a diagonal image composition template.

When a photographing device matches the image composition relationship between the second subject and the first subject with a diagonal image composition template, the photographing device analyzes whether the image composition relationship between the first subject and the second subject is in two diagonal lines, and if an angle between the first subject in the image composition relationship and one of the diagonal lines is smaller, an obtained rating of the matching evaluation degree is higher, and the image composition adjustment suggestion obtained in step 104 may suggest that the user adjust a framing angle of the first content.

After the first content is adjusted according to the image composition adjustment suggestion corresponding to the diagonal image composition template, the photographed first content is made to seem stereoscopic, extended, and dynamic.

Figure 3I:
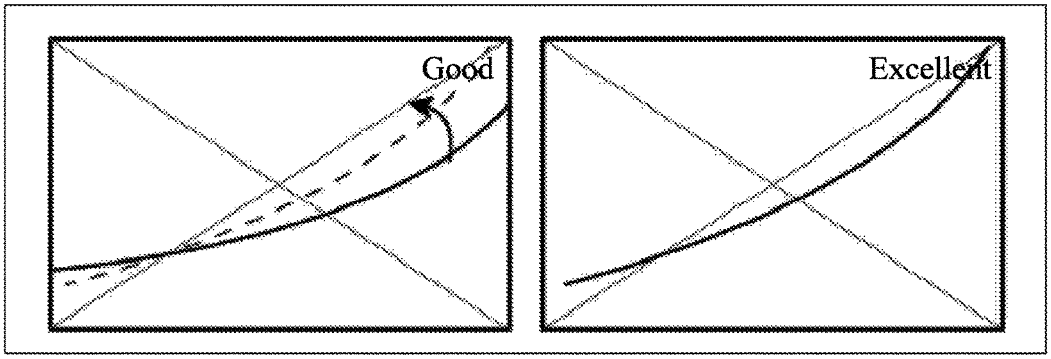
FIG. 3I is a schematic diagram of adjustment of photographed first content according to another embodiment of the present disclosure.

As shown in the left diagram of FIG. 3I, when the subject of concern (that is, the first subject) is a river, the photographing device generally chooses to match the image composition relationship between the first subject and the second subject with the diagonal image composition template. When it is found after matching that a path of the river is closer to a diagonal line from the lower left to the upper right, the matching evaluation degree is given a good rating, and in step 104, the image composition adjustment suggestion may suggest, using an illustration, that the path of the river be slightly rotated and adjusted to the closer diagonal line. After the user rotates the framing of the first content for adjustment, the rating of the matching evaluation degree is refreshed immediately, as shown in the right diagram of FIG. 3I.

Figure 3J:
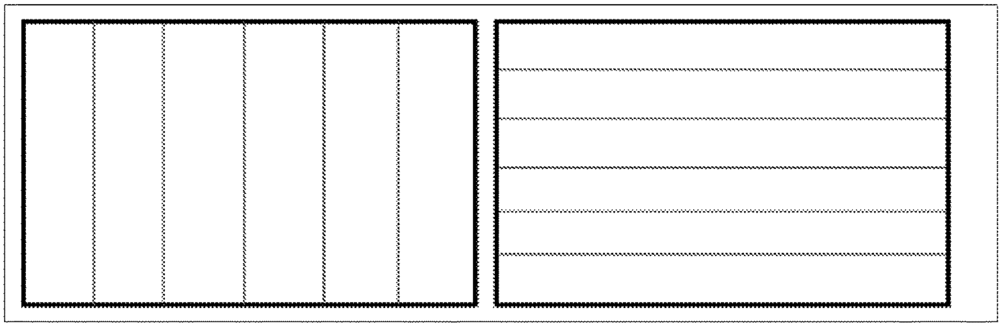
FIG. 3J is a schematic diagram of an image composition template according to another embodiment of the present disclosure.

As shown in the left diagram of FIG. 3J, in a fifth embodiment, the preset image composition template may be a vertical line image composition template. The right diagram of FIG. 3J shows a horizontal line image composition template.

When a photographing device matches an image composition relationship between a second subject and a first subject with a vertical line image composition template, the photographing device analyzes that a subject of concern (that is, the first subject) and a background subject (the second subject) are in parallel vertical lines. When the first subject and the second subject are closer to the parallel vertical lines (or a horizontal line) and filling is full, the relative rating of the matching evaluation degree is higher, and in step 104, the image composition adjustment suggestion may suggest, using an illustration, that the user adjust an angle of first content to be vertical. Generally, a vertical line image composition gives a person a visual perception of steadiness, balance, and reliability.

Figure 3K:
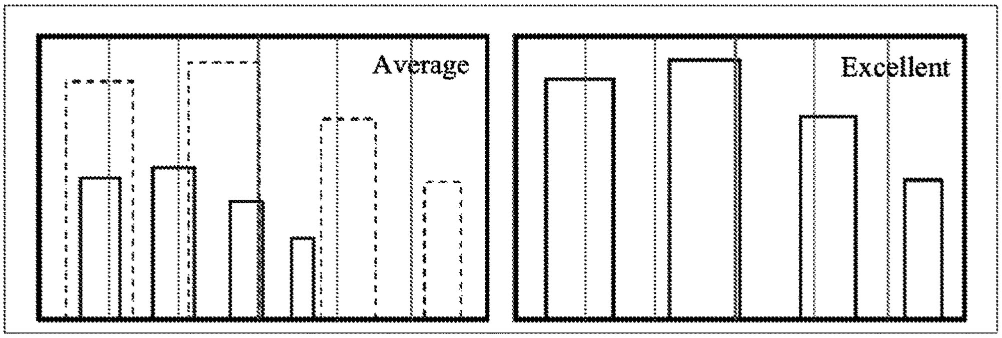
FIG. 3K is a schematic diagram of adjustment of photographed first content according to another embodiment of the present disclosure.

As shown in the left diagram of FIG. 3K, when the subject of concern is a group of buildings, it is found after matching that the group of buildings are all in parallel vertical lines, but the content is far from being full, and therefore, the rating of the matching evaluation degree gives an average rating, and in step 104, the image composition adjustment suggestion may suggest, using an illustration, that the user adjust a focal length to make the group of buildings look fuller in a picture, and further, the user adjusts the focal length or approaches to adjust the framing of the first content, the rating of the matching evaluation degree is refreshed accordingly, as shown in the right diagram of FIG. 3K.

In addition to the foregoing exemplified templates, the image composition template may be an S-shaped image composition template, an X-shaped image composition template, a centripetal image composition (a radially accumulated points image composition) template, a big and small template, a symmetrical and asymmetric image composition template, or the like.

A photographing method in this embodiment can enable a user to directly obtain image composition quality of a photo and obtain an image composition adjustment suggestion on to-be-photographed first content, and after the user adjusts the first content according to the image composition adjustment suggestion, the problem of poor photographing quality can be effectively solved.

Second Embodiment

Figure 4A:
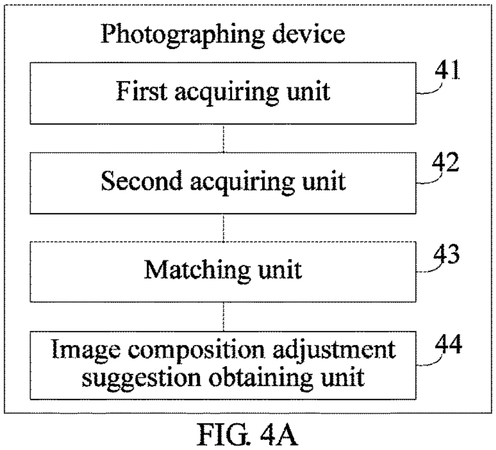
FIG. 4A and FIG. 4B are schematic structural diagrams of a photographing device according to an embodiment of the present disclosure.

An embodiment of the present disclosure provides a photographing device, and as shown in FIG. 4A the photographing device in this embodiment includes a first acquiring unit 41, a second acquiring unit 42, a matching unit 43, and an image composition adjustment suggestion obtaining unit 44, where the first acquiring unit 41 is configured to acquire to-be-photographed first content. The second acquiring unit 42 is configured to acquire an image composition relationship between a second subject in the first content and the first subject after the first acquiring unit 41 acquires the first content, and after a first subject with which a user is concerned in the first content is determined, where the second subject is a background subject in the first content except the first subject. The matching unit 43 is configured to match the image composition relationship between the second subject and the first subject with a preset image composition template to obtain a matching evaluation degree after the second acquiring unit 42 acquires the image composition relationship, and the image composition adjustment suggestion obtaining unit 44 is configured to provide an image composition adjustment suggestion on the first content for the user according to the matching evaluation degree and the preset image composition template after the matching unit 43 obtains the matching evaluation degree, where the adjustment suggestion is a tip on how to adjust the image composition relationship in the first content such that the image composition relationship completely matches the preset image composition template, where the matching evaluation degree indicates properness of the image composition relationship.

In an optional embodiment, the photographing device may further include a first subject selection unit which is not shown in the drawing, where the first subject selection unit is configured to select, by the user, the first subject of concern in the first content after the first acquiring unit 41 acquires the first content.

In another optional embodiment, the photographing device may further include a recognition unit and an image composition template selection unit which are not shown in the drawing, where the recognition unit is configured to recognize the first subject according to a subject image in a preset subject image library after the first acquiring unit 41 acquires the first content, and after the first subject with which the user is concerned in the first content is determined, and after the recognition unit recognizes the first subject the image composition template selection unit is configured to search, according to the recognized first subject, an image composition template library for an image composition template corresponding to the first subject, and use the found image composition template corresponding to the first subject as a preset image composition template.

The photographing device in the foregoing embodiment can solve the problem that in a photographing process, image composition quality of photographing cannot be determined or adjusted, which results in a poor photographing result.

Figure 4B:
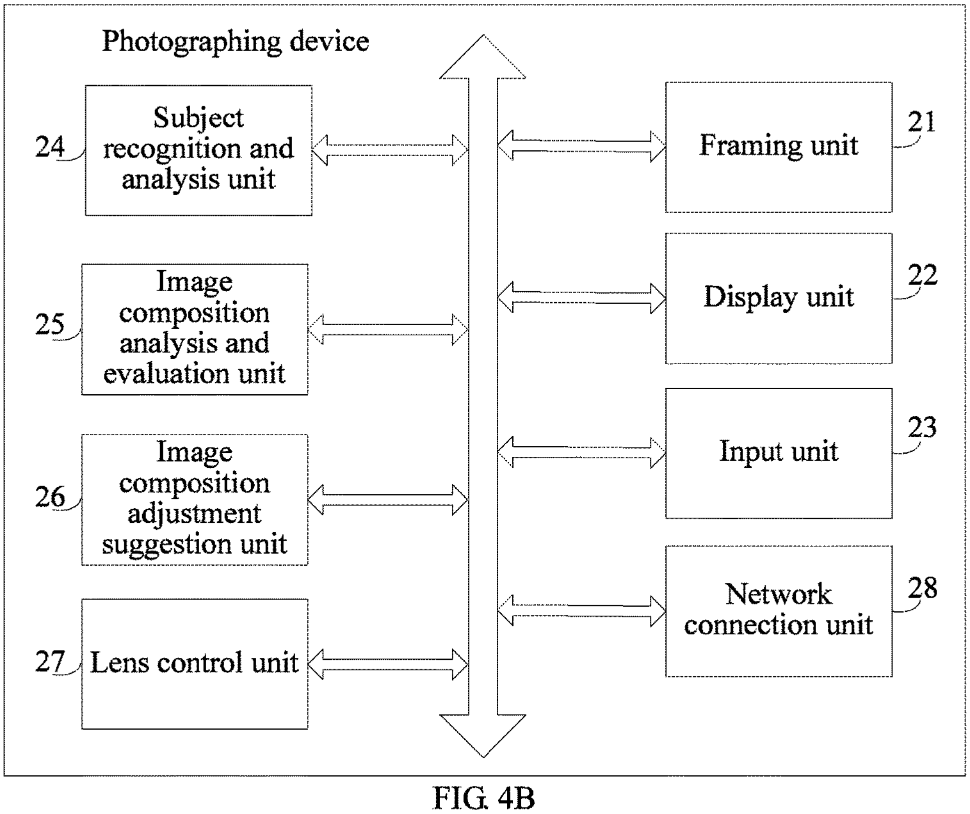
Figure 4C:
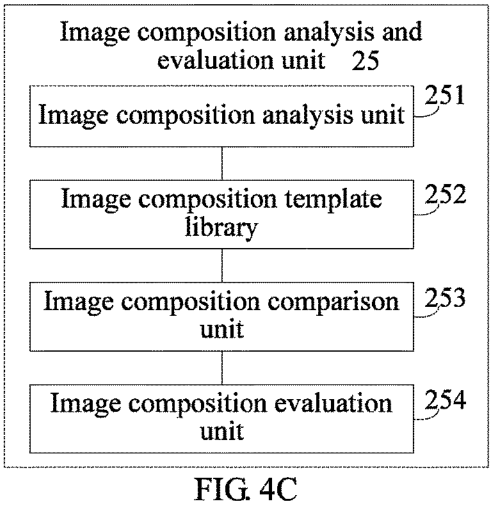
FIG. 4C is a schematic diagram of an image composition analysis and evaluation unit according to an embodiment of the present disclosure.

In a third optional implementation manner, the photographing device in this embodiment may include the following functional units. As shown in FIG. 4B, the photographing device includes a framing unit 21, a display unit 22, an input unit 23, a subject recognition and analysis unit 24, an image composition analysis and evaluation unit 25, an image composition adjustment suggestion unit 26, a lens control unit 27, and a network connection unit 28, where the framing unit 21 is configured to pre-frame first content to be photographed by a user, and output the to-be-photographed first content to the display unit 22 for display, where in a specific application, the framing unit 21 may include a lens, a light sensor, and the like. The display unit 22 is configured to display the first content to-be-photographed by the user, and may further be configured to display an image composition adjustment suggestion, and the like. The input unit 23 is configured to receive a choice input by the user, and select a first subject with which the user is concerned, where the input unit 23 may be various touch sensitive screens, for example, a capacitive sensing screen, a microwave sensing screen, a non-contact control output apparatus, and the like, and the input unit 23 may further be replaced by a focal point analysis unit, and focused content in the to-be-photographed first content is set by default as the subject with which the user is concerned. The subject recognition and analysis unit 24 is configured to analyze and extract the first subject with which the user is concerned, and is configured to analyze and recognize another background subject, and the subject recognition and analysis unit 24 may further be configured to analyze detailed features of the first subject, such as color information, body type, and vagueness of an outline. As shown in FIG. 4C, the image composition analysis and evaluation unit 25 is configured to determine an image composition relationship between the first subject and a second subject, and make comparison and analysis to give an image composition quality evaluation according to a pre-stored image composition template, and the image composition analysis and evaluation unit 25 further includes an image composition analysis unit 251, an image composition template library 252, an image composition comparison unit 253, an image composition evaluation unit 254, and the like.

The image composition analysis unit 251 is configured to give an image composition relationship between a subject of concern (the first subject) and a background subject (the second subject), select a proper image composition template, and the like.

The image composition template library 252 is a knowledge base of image composition templates, and the image composition template library may be stored in a photographing apparatus locally, or may be placed in the cloud using a network. Certainly, the image composition analysis unit 251 may also be implemented entirely in the cloud. The image composition template library 252 includes various image composition templates such as the examples described above.

The image composition comparison unit 253 is configured to compare the existing image composition relationship between the first subject and the second subject in the first content, and a process of matching the image composition relationship and the image composition template, and analyze a matching evaluation degree.

The image composition evaluation unit 254 is configured to give an evaluation of the matching evaluation degree after the analysis by the image composition comparison unit 253.

The image composition adjustment suggestion unit 26 of FIG. 4B is configured to give an image composition adjustment suggestion according to the analysis by the image composition analysis and evaluation unit 25, where the image composition adjustment suggestion may be given using an illustration, words, a voice prompt, or the like. If the image composition adjustment suggestion is an illustrated suggestion, the suggestion may include an arrow indicating a direction of adjustment, or give a dotted box of an ideal image composition location, or the like.

In a specific application, the photographing device may further include a lens control unit 27 configured to control, according to the adjustment suggestion output by the image composition adjustment suggestion unit 26, a lens to adjust image composition, where the lens control unit 27 may include a lens adjustment control signal generating unit and a lens control adjustment execution unit (not shown in the drawing), and for example, the lens control unit 27 may be a servo motor, where the servo motor may include a front and back adjustment motor, and may also include a left and right adjustment motor, an up and down adjustment motor, and the like.

For example, the image composition adjustment suggestion unit 26 outputs an image composition adjustment suggestion to the lens control unit 27, and the lens control unit 27 adjusts the lens to make the image composition better match the image composition template in order to improve the image composition quality. FIG. 3K is used as an example. The image composition adjustment suggestion unit 26 outputs a suggestion for zooming in the first subject of concern (a group of buildings), and the lens control unit 27 outputs a control instruction, for example, the servo motor adjusts the lens to zoom in the first subject of concern in order to implement more flexible image composition adjustment.

In another implementation manner, the foregoing photographing device may further include a network connection unit 28 configured to connect to a network, for example, when in a network cloud, the image composition analysis and evaluation unit 25 or the image composition template library 252 may be connected to the network using the network connection unit 28 to implement a photographing system formed by both the photographing device and the network, and a function of image composition analysis, evaluation, and suggestion is implemented, where the network connection unit 28 may be a wireless cellular system, and may be a WI-FI wireless connection unit, a wired network connection, or the like.

The foregoing photographing device can give an image composition quality evaluation such that the user obtains in a timely manner a prompt for adjusting the image composition, and obtains a suggestion for optimizing the image composition such that the user can adjust in a timely manner the image composition to take a photo of better quality.

Third Embodiment

Figure 5:
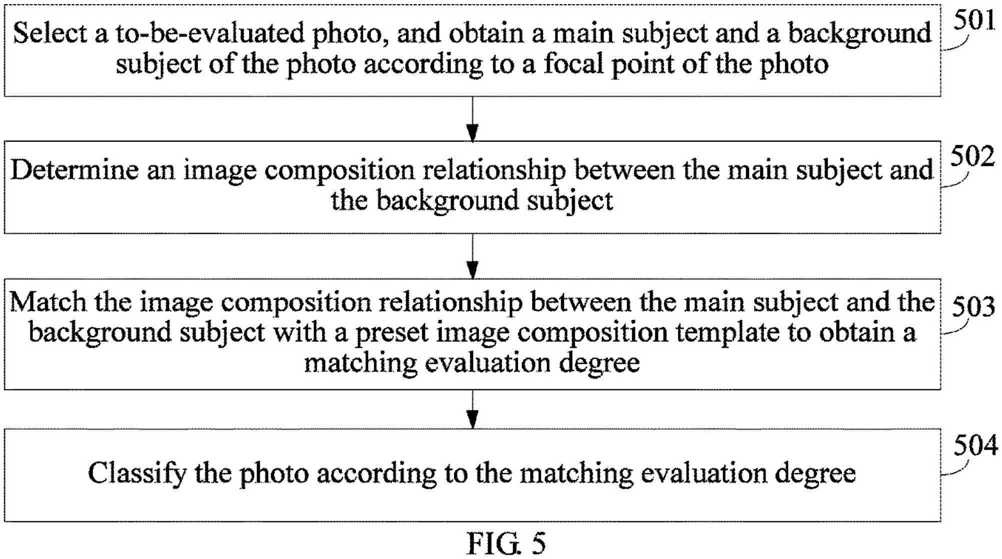
FIG. 5 is a schematic flowchart of a photo management method according to an embodiment of the present disclosure.

FIG. 5 shows a photo management method according to an embodiment of the present disclosure. As shown in FIG. 5, the photo management method in this embodiment is described as follows.

Step 501: Select a to-be-evaluated photo, and obtain a main subject and a background subject of the photo according to a focal point of the photo.

In another embodiment, a user may input in advance a to-be-evaluated photo.

Step 502: Determine an image composition relationship between the main subject and the background subject.

Step 503: Match the image composition relationship between the main subject and the background subject with a preset image composition template to obtain a matching evaluation degree.

In this embodiment, the matching evaluation degree indicates properness of the image composition relationship.

For example, an image composition relationship between a subject of concern and another background subject is analyzed and determined, and is matched with an image composition template in an image composition template library, and a matching evaluation degree of current image composition by a user is given according to a matching degree.

Alternatively, according to features of the main subject, a preferential image composition template is selected for matching, to obtain the matching evaluation degree.

The matching evaluation degree may be a qualitative evaluation such as "good," "excellent," or "poor," or may be a quantitative evaluation such as a rating of "5 points." "3 points," or "1 point."

Further, a reason for the evaluation may be given, for example, similar to "the head is incomplete," "the person is too small." or the like.

Moreover, the preset image composition template may be a golden section image composition template, a compact image composition template, a triangular image composition template, a diagonal image composition template, a vertical line image composition template, a horizontal line image composition template, or the like.

Step 504: Classify the photo according to the matching evaluation degree.

For example, a photo evaluated to be good or better is put into a folder, and a photo evaluated to be poor is put into a folder.

Further, a prompt to the user on whether to delete a photo with poor quality may be included. Photos of poor image composition quality may be deleted in batches if the user confirms "yes."

It can be seen from the foregoing embodiment that, in a photographing management method in this embodiment, an image composition relationship between a main subject and a background subject in a to-be-evaluated photo is analyzed, an image composition template is further selected, and a matching evaluation degree of the to-be-evaluated photo is acquired such that the problem that a photo cannot be automatically recognized and managed can be solved.

Fourth Embodiment

Figure 6A:
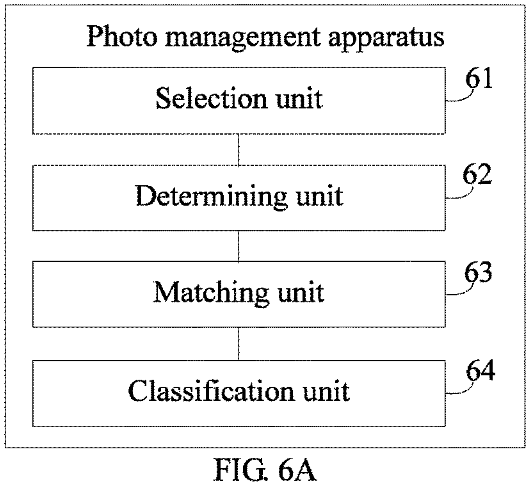
FIG. 6A and FIG. 6B are schematic structural diagrams of a photo management apparatus according to an embodiment of the present disclosure.

FIG. 6A is a schematic structural diagram of a photographing management apparatus according to an embodiment of the present disclosure. As shown in FIG. 6, the photo management apparatus in this embodiment includes a selection unit 61, a determining unit 62, a matching unit 63, and a classification unit 64, where the selection unit 61 is configured to select a to-be-evaluated photo, and obtain a main subject and a background subject of the photo according to a focal point of the photo. The determining unit 62 is configured to determine an image composition relationship between the main subject and the background subject after the selection unit 61 obtains the main subject. The matching unit 63 is configured to match the image composition relationship between the main subject and the background subject with a preset image composition template to obtain a matching evaluation degree after the determining unit 62 determines the image composition relationship, and the classification unit 64 is configured to classify the photo according to the matching evaluation degree after the matching unit 63 obtains the matching evaluation degree, where the matching evaluation degree indicates properness of the image composition relationship.

A photo management apparatus in this embodiment can automatically recognize a photo with poor image composition quality, and classify and manage photos with poor quality, thereby solving the problem in the prior art that a user needs to recognize the photos one by one and processing efficiency is not high.

Figure 6B:
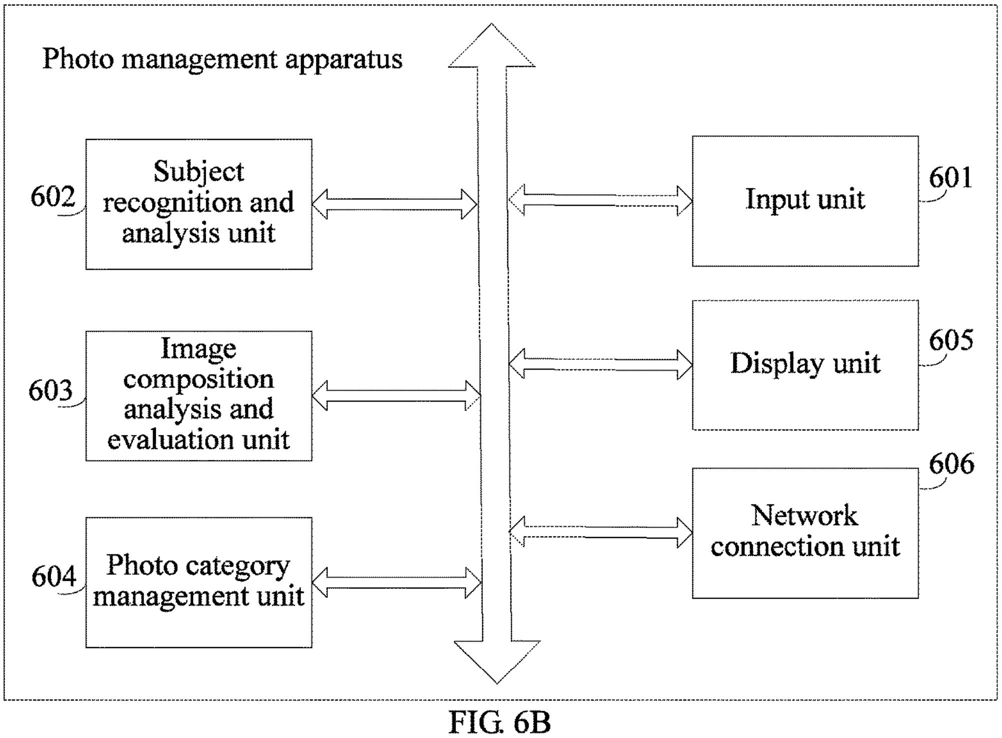
Figure 6C:
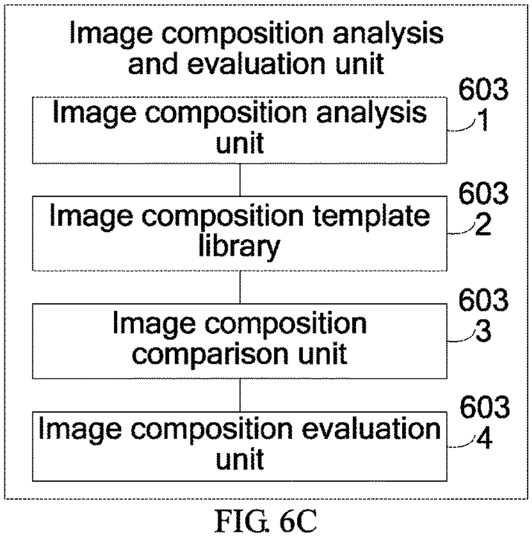
FIG. 6C is a schematic diagram of an image composition analysis and evaluation unit according to an embodiment of the present disclosure.

In another embodiment. FIG. 6B is a schematic structural diagram of a photo management apparatus according to an embodiment of the present disclosure. As shown in FIG. 6B, the photo management apparatus in this embodiment includes an input unit 601, a subject recognition and analysis unit 602, an image composition analysis and evaluation unit 603, a photo category management unit 604, a display unit 605, and a network connection unit 606, where the input unit 601 is configured to receive an input photo on which image composition evaluation and analysis are to be performed. The subject recognition and analysis unit 602 is configured to analyze, extract, and recognize a main subject in the photo, and configured to analyze and recognize another background subject. For example, a subject located at a clearest focal point of the photo is determined as the main subject, and the subject recognition and analysis unit 602 may further be configured to analyze detailed features of a main subject, such as color information, body type, and vagueness of an outline. The image composition analysis and evaluation unit 603 is configured to determine an image composition relationship between a subject of concern and a background subject, and make comparison and analysis to give an image composition quality evaluation according to a pre-stored image composition template. As shown in FIG. 6C, the image composition analysis and evaluation unit 603 may further include an image composition analysis unit 6031, an image composition template library 6032, an image composition comparison unit 6033, an image composition evaluation unit 6034, and the like.

The image composition analysis unit 6031 is configured to give the image composition relationship between the subject of concern and the background subject, select a proper image composition template, and the like.

The image composition template library 6032 is a knowledge base of image composition templates, and the image composition template library 6032 may be stored in the photo management apparatus locally, or may be placed in the cloud using a network. Certainly, the entire image composition analysis unit 6031 may be implemented in the cloud. The image composition template library 6032 includes various image composition templates such as the examples described above.

The image composition comparison unit 6033 is configured to compare the image composition relationship between the subject of concern and the background subject with the image composition template.

The image composition evaluation unit 6034 is configured to give a matching evaluation degree according to the analysis by the image composition comparison unit 6033.

The photo category management unit 604 is configured to determine a quality category of a photo, and perform category management, according to an evaluation result by the image composition evaluation unit 6034.

Further, the photo management apparatus may include a display unit 605 configured to output and display a classification result, and may further give a reason for the classification, give a prompt on whether a photo with poor quality is to be deleted, and the like.

The photo management apparatus may further include a network connection unit 606 configured to connect to the network, for example, when the image composition analysis and evaluation unit or the image composition template library 6032 is in the network cloud, it may connect to the network using a network connection unit 606, thereby implementing that this machine forms a photographing system together with the network. The image composition analysis is implemented. The network connection unit 606 may be a wireless cellular system, may be a WI-FI wireless connection unit, or is a wired network connection.

By determining photo image composition quality, a photo management apparatus of this embodiment automatically recognizes a photo with poor quality, and classifies and manages photos with poor quality, thereby solving the problem that a smart camera cannot automatically manage a photo.

Figure 7:
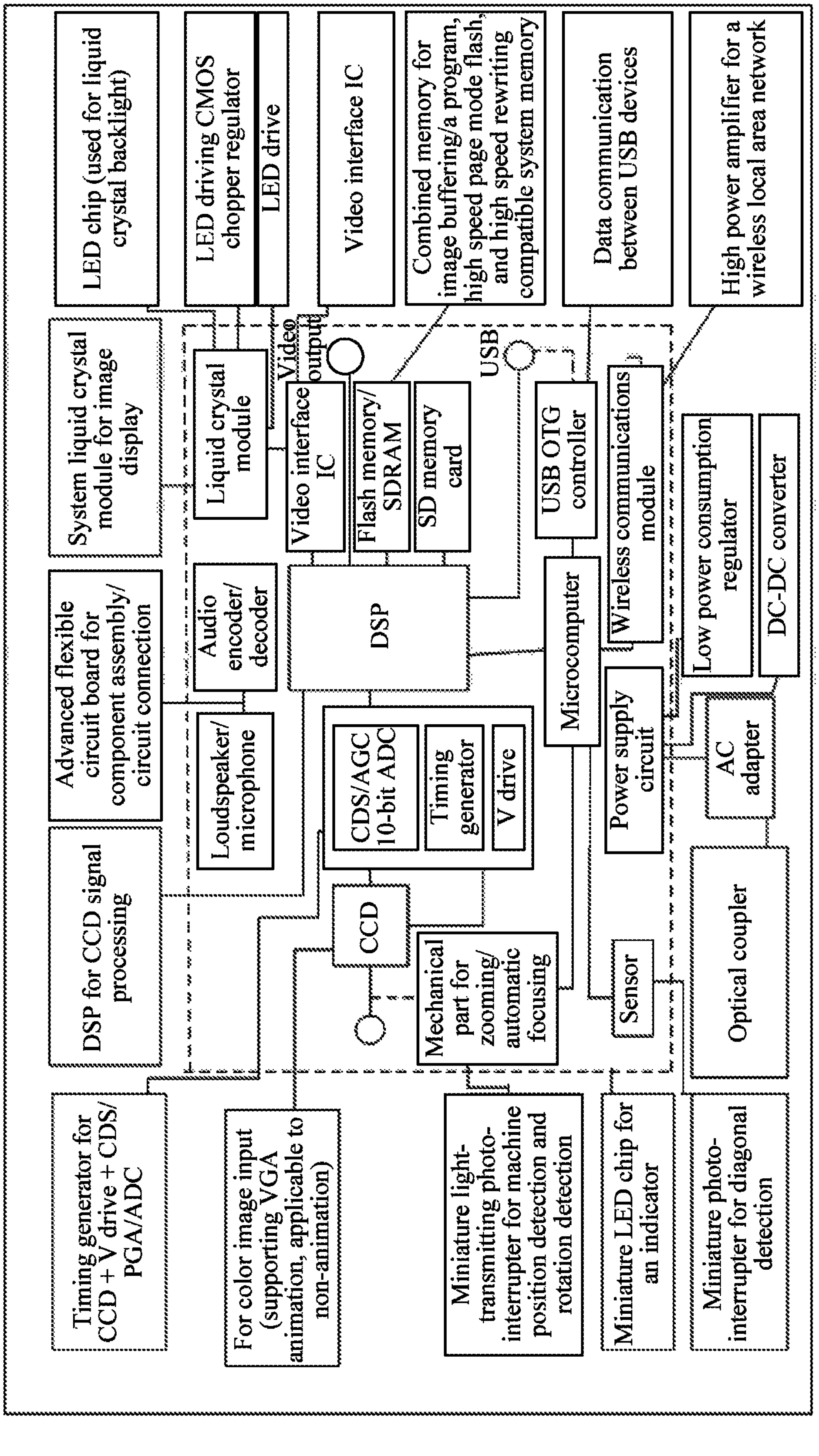
FIG. 7 is a schematic structural diagram of a photographing device according to an embodiment of the present disclosure.

FIG. 7 is a schematic structural diagram of a photographing device according to an embodiment of the present disclosure. The foregoing photographing device in FIG. 4A may be of a structure shown in FIG. 7.

Certainly, in an actual application, the photographing device may also have a function of the photo management apparatus. Therefore, the photo management apparatus shown in FIG. 6A or FIG. 6B may be a part of the photographing device.

Persons of ordinary skill in the art may understand that all or a part of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A photographing method, comprising:

acquiring a first content that is to-be-photographed;

acquiring an image composition relationship between a second subject in the first content and a first subject after determining the first subject with which a user is concerned in the first content, wherein the second subject is a background subject in the first content except the first subject;

matching the image composition relationship between the second subject and the first subject with a preset image composition template to obtain a matching evaluation degree; and providing an image composition adjustment suggestion on the first content for the user according to the matching evaluation degree and the preset image composition template, wherein the image composition adjustment suggestion is a tip on how to adjust the image composition relationship in the first content such that the image composition relationship matches the preset image composition template, and wherein the matching evaluation degree indicates properness of the image composition relationship.

2. The method according to claim 1, wherein before acquiring the image composition relationship between the second subject in the first content and the first subject, the method further comprises receiving a first subject of concern in the first content selected by the user.

3. The method according to claim 1, wherein before acquiring the image composition relationship between the second subject in the first content and the first subject, the method further comprises recognizing the first subject according to subject images in a preset subject image library, and wherein before matching the image composition relationship between the second subject and the first subject with the preset image composition template, the method further comprises;

searching, according to the recognized first subject, an image composition template library for an image composition template corresponding to the first subject; and setting the image composition template corresponding to the first subject as the preset image composition template.

4. The method according to claim 1, wherein the preset image composition template is at least one of a golden section template, a compact template, a triangular image composition template, a diagonal image composition template, a vertical line image composition template, and a horizontal line image composition template.

5. A photographing device, comprising:

a memory configured to:

store a first content that is to-be-photographed; and store an image composition relationship between a second subject in the first content and a first subject after acquiring the first content after the first subject with which a user is concerned in the first content is determined, wherein the second subject is a background subject in the first content except the first subject; and a processor coupled to the memory and configured to:

match the image composition relationship between the second subject and the first subject with a preset image composition template to obtain a matching evaluation degree after the memory stores the image composition relationship; and provide an image composition adjustment suggestion on the first content for the user according to the matching evaluation degree and the preset image composition template after obtaining the matching evaluation degree, wherein the image composition adjustment suggestion is a tip on how to adjust the image composition relationship in the first content such that the image composition relationship matches the preset image composition template, and wherein the matching evaluation degree indicates properness of the image composition relationship.

6. The photographing device according to claim 5, wherein the memory is further configured to store a first subject of concern in the first content selected by the user after acquiring the first content.

7. The photographing device according to claim 5, wherein the processor is further configured to:

recognize the first subject according to subject images in a preset subject image library after the receiver memory acquires the first content, and after the first subject with which the user is concerned in the first content is determined;

search, according to the recognized first subject, an image composition template library for an image composition template corresponding to the first subject; and set the image composition template corresponding to the first subject as the preset image composition template after recognizing the first subject.

8. A photo management method, comprising:

selecting a photo that is to-be-evaluated;

obtaining a main subject and a background subject of the photo according to a focal point of the photo;

determining an image composition relationship between the main subject and the background subject;

matching the image composition relationship between the main subject and the background subject with a preset image composition template to obtain a matching evaluation degree; and classifying the photo according to the matching evaluation degree, wherein the matching evaluation degree indicates properness of the image composition relationship.

9. The method according to claim 8, wherein the preset image composition template is at least one of a golden section template, a compact template, a triangular image composition template, a diagonal image composition template, a vertical line image composition template, and a horizontal line image composition template.

10. A photo management apparatus, comprising:

a memory configured to store instructions; and a processor coupled to the memory and configured to execute the instructions to:

select a photo that is to-be-evaluated;

obtain a main subject and a background subject of the photo according to a focal point of the photo;

determine an image composition relationship between the main subject and the background subject;

match the image composition relationship between the main subject and the background subject with a preset image composition template to obtain a matching evaluation degree; and classify the photo according to the matching evaluation degree, wherein the matching evaluation degree indicates properness of the image composition relationship.

11. A non-transitory computer readable medium comprising instructions which, when executed by a computer, cause the computer to:

acquire a first content that is to-be-photographed;

acquire an image composition relationship between a second subject in the first content and a first subject after determining the first subject with which a user is concerned in the first content, wherein the second subject is a background subject in the first content except the first subject;

match the image composition relationship between the second subject and the first subject with a preset image composition template to obtain a matching evaluation degree; and provide an image composition adjustment suggestion on the first content for the user according to the matching evaluation degree and the preset image composition template, wherein the image composition adjustment suggestion is a tip on how to adjust the image composition relationship in the first content such that the image composition relationship matches the preset image composition template, and wherein the matching evaluation degree indicates properness of the image composition relationship.

12. The non-transitory computer readable medium according to claim 11, wherein before acquiring the image composition relationship between the second subject in the first content and the first subject, the instructions further cause the computer to receive a first subject of concern in the first content selected by the user.

13. The non-transitory computer readable medium according to claim 11, wherein before acquiring the image composition relationship between the second subject in the first content and the first subject, the instructions further cause the computer to recognize the first subject according to subject images in a preset subject image library, and wherein before matching the image composition relationship between the second subject and the first subject with the preset image composition template, the instructions further cause the computer to:

search, according to the recognized first subject, an image composition template library for an image composition template corresponding to the first subject; and set the image composition template corresponding to the first subject as the preset image composition template.

14. The non-transitory computer readable medium according to claim 11, wherein the preset image composition template is at least one of a golden section template, a compact template, a triangular image composition template, a diagonal image composition template, a vertical line image composition template, and a horizontal line image composition template.

15. A non-transitory computer readable medium comprising instructions which, when executed by a computer, cause the computer to:

select a photo that is to-be-evaluated;

obtain a main subject and a background subject of the photo according to a focal point of the photo;

determine an image composition relationship between the main subject and the background subject;

match the image composition relationship between the main subject and the background subject with a preset image composition template to obtain a matching evaluation degree; and classify the photo according to the matching evaluation degree, wherein the matching evaluation degree indicates properness of the image composition relationship.

16. The non-transitory computer readable medium according to claim 15, wherein the preset image composition template is at least one of a golden section template, a compact template, a triangular image composition template, a diagonal image composition template, a vertical line image composition template, and a horizontal line image composition template.

* * * * *

UNITED STATES PATENT AND TRADEMARK OFFICE

CERTIFICATE OF CORRECTION

PATENT NO. : 9,971,955 B2
APPLICATION NO. : 15/447876
DATED : May 15, 2018
INVENTOR(S) : Zhen He et al.

It is certified that error appears in the above-identified patent and that said Letters Patent is hereby corrected as shown below:

On the Title Page

Under item Notice should read:
Subject to any disclaimer, the term of this patent is extended or adjusted under 35 U.S.C. 154(b) by 0 days.

In the Claims

Column 19; Line 15; Claim 7 should read:
a preset subject image library after the memory Signed and Sealed this
Third Day of July, 2018

Andrei Iancu
*Director of the United States Patent and Trademark Office*